United States Patent
Kwon et al.

(10) Patent No.: US 10,062,916 B2
(45) Date of Patent: Aug. 28, 2018

(54) CONTROL METHOD AND SYSTEM OF FUEL CELL SYSTEM

(71) Applicant: Hyundai Motor Company, Seoul (KR)

(72) Inventors: Sang Uk Kwon, Gyeongi-do (KR); Heon Joong Lee, Seoul (KR); Yei Sik Jeon, Seoul (KR); Sung Gone Yoon, Gyeonggi-do (KR); Ik Jae Son, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 260 days.

(21) Appl. No.: 14/737,676

(22) Filed: Jun. 12, 2015

(65) Prior Publication Data
US 2016/0164127 A1   Jun. 9, 2016

(30) Foreign Application Priority Data
Dec. 9, 2014   (KR) ................. 10-2014-0176003

(51) Int. Cl.
| | | |
|---|---|---|
| *H01M 8/04* | (2016.01) | |
| *H01M 8/04537* | (2016.01) | |
| *H01M 8/04746* | (2016.01) | |
| *H01M 8/04992* | (2016.01) | |
| *H01M 8/0438* | (2016.01) | |
| *H01M 8/04303* | (2016.01) | |
| *H01M 8/04228* | (2016.01) | |
| *H01M 8/04858* | (2016.01) | |
| *H01M 8/04223* | (2016.01) | |
| *H01M 8/0444* | (2016.01) | |
| *H01M 8/04225* | (2016.01) | |

(52) U.S. Cl.
CPC ... *H01M 8/04559* (2013.01); *H01M 8/04228* (2016.02); *H01M 8/04303* (2016.02); *H01M 8/04395* (2013.01); *H01M 8/04753* (2013.01); *H01M 8/04992* (2013.01); *H01M 8/04225* (2016.02); *H01M 8/04231* (2013.01); *H01M 8/04447* (2013.01); *H01M 8/04888* (2013.01); *H01M 2250/20* (2013.01); *Y02T 90/32* (2013.01)

(58) Field of Classification Search
CPC ......... H01M 8/04559; H01M 8/04228; H01M 8/04303; H01M 8/04395; H01M 8/04753; H01M 8/04992; H01M 8/04225; H01M 8/04231; H01M 8/04447; H01M 8/04888; H01M 2250/20; Y02T 90/32
See application file for complete search history.

(56) References Cited

U.S. PATENT DOCUMENTS

| | | | | |
|---|---|---|---|---|
| 2012/0171590 | A1* | 7/2012 | Matsumoto | H01M 8/04253 429/442 |
| 2013/0004869 | A1* | 1/2013 | Yamaga | H01M 8/04007 429/429 |
| 2013/0017458 | A1* | 1/2013 | Umeda | H01M 8/04231 429/410 |

FOREIGN PATENT DOCUMENTS

| | | |
|---|---|---|
| JP | 2001-118594 A | 4/2001 |
| JP | 2004-172027 A | 6/2004 |
| JP | 2004-172028 A | 6/2004 |

(Continued)

*Primary Examiner* — Raymond Alejandro
(74) *Attorney, Agent, or Firm* — Mintz Levin Cohn Ferris Glovsky and Popeo, P.C.; Peter F. Corless (57) ABSTRACT

A control method and system of a fuel cell system is provided. The control method includes detecting, by a controller, a voltage of a fuel cell stack when power generation of a fuel cell is stopped while a fuel cell vehicle is being driven. In addition, hydrogen supply pressure at an anode side is adjusted based on a variation in the detected voltage.

34 Claims, 5 Drawing Sheets

(56) References Cited

FOREIGN PATENT DOCUMENTS

| | | |
|---|---|---|
| JP | 2006-086006 A | 3/2006 |
| JP | 2009-301771 A | 12/2009 |
| JP | 2010-080109 A | 4/2010 |
| JP | 2010-272505 A | 12/2010 |
| JP | 2011-216335 A | 10/2011 |
| KR | 10-2010-0060478 A | 6/2010 |

* cited by examiner

CONTROL METHOD AND SYSTEM OF FUEL CELL SYSTEM

CROSS REFERENCE TO RELATED APPLICATION

The present application claims priority of Korean Patent Application Number 10-2014-0176003 filed on Dec. 9, 2014, the entire contents of which application are incorporated herein by this reference for all purposes.

BACKGROUND

1. Field of the Invention

The present invention generally relates to a control method and system of a fuel cell system and, more particularly, to a control method and system of a fuel cell system, which vary hydrogen supply pressure when stopping power generation of a fuel cell.

2. Description of the Related Art

A fuel cell system applicable to a hydrogen fuel cell vehicle, a type of eco-friendly vehicle, is composed of a fuel cell stack that generates electric power from an electrochemical reaction of reactant gases; a hydrogen supplying system configured to supply hydrogen as fuel to a fuel cell stack; an air supplying system configured to supply gas including oxygen as an oxidant in electrochemical reactions; and a heat and water management system configured to manage water and maintain an optimal fuel cell stack temperature for driving by emitting heat, which is a by-product of the electrochemical reactions therein.

Figure 1:
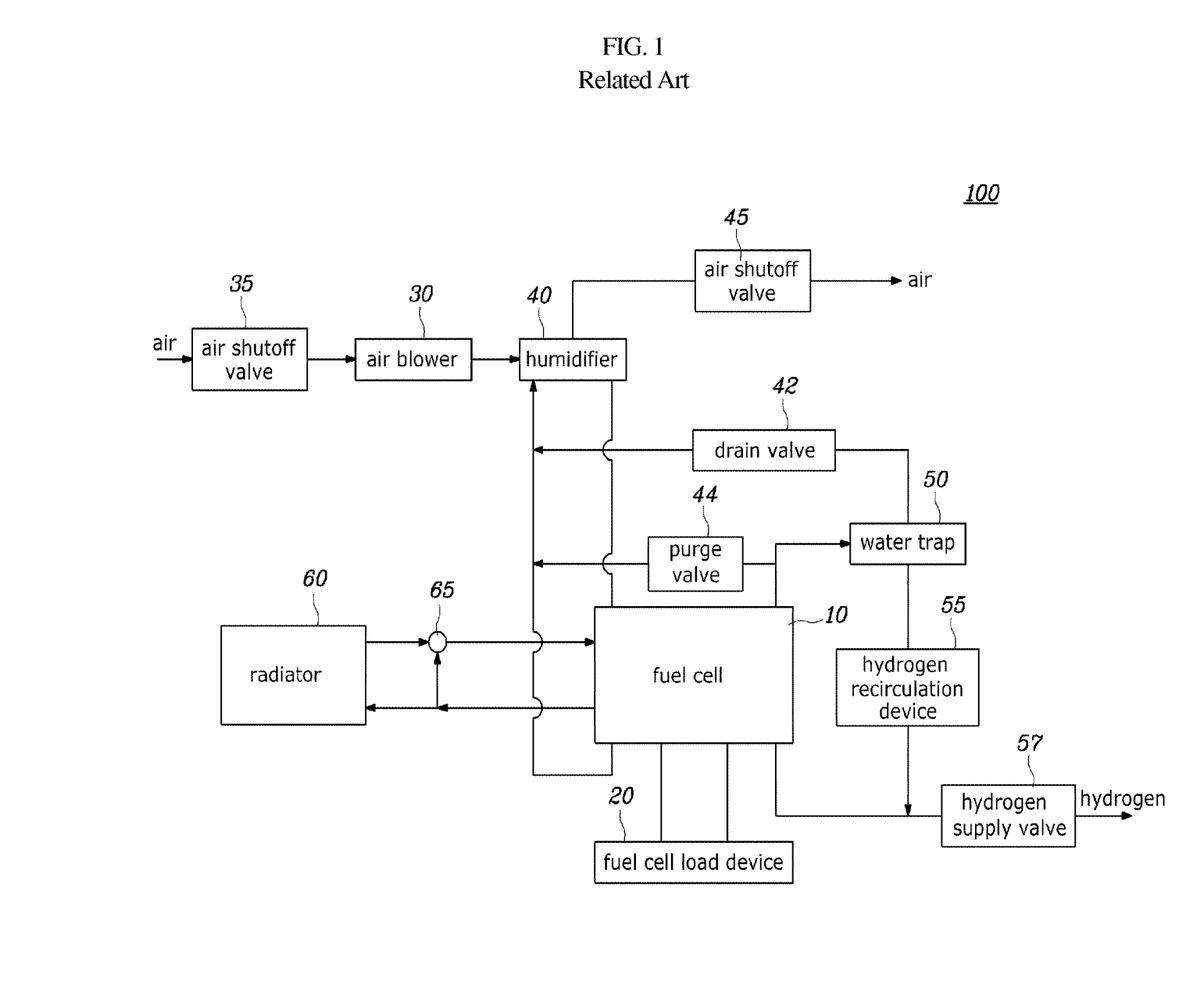
FIG. 1 is an exemplary view illustrating an overall fuel cell system according to the related art.

FIG. 1 is an exemplary view illustrating an overall fuel cell system. As shown in FIG. 1, the fuel cell system 100 includes a fuel cell stack 10, a fuel cell load device 20, an air blower 30, a humidifier 40, air shutoff valves 35 and 45 in an inlet and outlet, a drain valve 42, a purge valve 44, a water trap 50, a hydrogen recirculation device 55, a hydrogen supply valve 57, a radiator 60, and a thermostat 65. The air shutoff valves 35 and 45 in the inlet and outlet may prevent inflow of air to the fuel cell stack after a fuel cell vehicle shuts down. The drain valve 42 is disposed within a hydrogen exhaust line to remove water generated at an anode, and the purge valve 44 adjusts hydrogen concentrations at the anode and exhausts hydrogen to an air outlet to dilute the air.

Further, the fuel cell load device 20 that reduces the voltage of the fuel cell stack 10 to drain the voltage is connected to the fuel cell stack 10 to remove oxygen within the fuel cell stack 10 while the fuel cell vehicle is shutting down and after the fuel cell vehicle has shut down. The oxygen flowing into the fuel cell stack 10 is removed with residual hydrogen that collects at the anode as the fuel cell load device 20 consumes current. However, insufficient hydrogen may preclude complete consumption of the oxygen, and thus a Wakeup technique is used to periodically supply hydrogen to the anode. When stopping power generation of a fuel cell (FC STOP), the amount of hydrogen crossover from the anode to a cathode should be decreased through anode pressure control to comply with exhaust gas regulations. Accordingly, a method for decreasing the amount of hydrogen crossover is required.

SUMMARY

Accordingly, an object of the present invention is to provide a control method and system of a fuel cell system, which minimizes hydrogen crossover by varying hydrogen supply pressure when stopping power generation of a fuel cell. In particular, a control method of a fuel cell system according to an exemplary embodiment of the present invention may include: detecting a voltage of a fuel cell stack when stopping power generation of a fuel cell while driving a fuel cell vehicle; and adjusting hydrogen supply pressure at an anode side based on a variation in the detected voltage.

The adjustment of the hydrogen supply pressure may be performed when the voltage of the fuel cell stack is less than a predetermined reference voltage after stopping the power generation of the fuel cell. The predetermined reference voltage may be a voltage of when the voltage of the fuel cell stack has been forcibly reduced by a load after stopping the power generation of the fuel cell. In addition, the adjustment of the hydrogen supply pressure may further include adjusting a voltage of a main bus terminal connected at an output side of the fuel cell stack to be greater than the voltage of the fuel cell stack.

The shutting off of the supply of air to the fuel cell stack may be further included before adjusting the hydrogen supply pressure. Additionally, the adjustment of the hydrogen supply pressure at the anode side may include increasing hydrogen supply pressure when the voltage of the fuel cell stack is increased due to inflow of air to the fuel cell stack. The adjustment of the hydrogen supply pressure at the anode side may further include reducing the hydrogen supply pressure as the voltage of the fuel cell stack is decreased. Adjusting the hydrogen supply pressure at the anode side adjusts the hydrogen supply pressure with a hysteresis range based on the variation in the voltage of the fuel cell stack.

The control method of the fuel cell system may further include: comparing a preset reference time period with a processing time for adjusting the hydrogen supply pressure at the anode side; and further purging the anode with hydrogen when restarting power generation of the fuel cell, when the processing time is greater than the preset reference time period based on the lowered hydrogen supply pressure. The number of times that further purging is performed may be proportional to the processing time exceeding the preset reference time period. Further, the control method of the fuel cell system may include: comparing a preset reference pressure with a time integral of the difference between a hydrogen supply pressure reduced by adjusting the hydrogen supply pressure and an initial hydrogen supply pressure in which power generation of the fuel cell is stopped; and further purging the anode with hydrogen when restarting power generation of the fuel cell, when the integral is greater than the preset reference pressure. The number of times that further purging is performed may be proportional to the difference between the integral and the preset reference pressure.

Additionally, a preset amount of nitrogen may be compared with a time integral of a transfer rate of nitrogen moved into an anode side by adjusting the hydrogen supply pressure; and further purging the anode with hydrogen when restarting power generation of the fuel cell, when the integral value is greater than the preset amount of nitrogen. The number of times that further purging is performed may be proportional to the difference between the integral and the preset amount of nitrogen. A cathode may be supplied with air after an amount of hydrogen at the anode side reaches a target amount as the hydrogen supply pressure is increased by restarting the power generation of the fuel cell. Further purging the anode with hydrogen may be performed after supplying air to the cathode. Before the amount of hydrogen at the anode side reaches the target amount, a voltage of a main bus terminal connected at an output side of the fuel cell stack is adjusted to be greater than the voltage of the fuel cell stack.

The control method of the fuel cell system may further include: comparing a preset reference time period with a processing time for adjusting the hydrogen supply pressure at the anode side; and increasing hydrogen supply pressure during a predetermined time period when restarting power generation of the fuel cell if the processing time is greater than the preset reference time period based on the reduced hydrogen supply pressure. The processing time exceeding the preset reference time period may be proportional to at least one of both the predetermined time period and the increased hydrogen supply pressure.

A preset reference pressure may also be compared with a time integral of the difference between hydrogen supply pressure reduced by adjusting the hydrogen supply pressure and an initial hydrogen supply pressure in which the power generation of the fuel cell is stopped; and increasing hydrogen supply pressure during an predetermined time period when restarting the power generation of the fuel cell when the integral is greater than the preset reference pressure. The difference between the integral and the preset reference pressure may be proportional to at least one of both the predetermined time period and the increased hydrogen supply pressure.

In addition, a preset amount of nitrogen may be compared with a time integral of a transfer rate of nitrogen moved into the anode side by adjusting the hydrogen supply pressure and hydrogen supply pressure may be increased during an predetermined time period when restarting power generation of the fuel cell if the integral is greater than the preset amount of nitrogen. The difference between the integral and the preset amount of nitrogen may be proportional to at least one of the predetermined time period and the increased hydrogen supply pressure.

The transfer rate of nitrogen may be dependent on at least one among a humidified state of the fuel cell stack, a voltage of the fuel cell stack, and the difference between hydrogen supply pressure lowered by adjusting the hydrogen supply pressure and an initial hydrogen supply pressure in which the power generation of the fuel cell is stopped. The transfer rate of nitrogen may be increased as a humidified state of the fuel cell stack increases, as a temperature of the fuel cell stack increases, as a voltage of the fuel cell stack decreases, and as the difference between hydrogen supply pressure reduced by adjusting the hydrogen supply pressure and an initial hydrogen supply pressure in which the power generation of the fuel cell is stopped is substantial.

The integral may have an upper limit which may be increased when a ram air flow is injected. Restarting the power generation of the fuel cell may also be performed when the integral is greater than a preset value. Further purging with hydrogen may be further included after increasing the hydrogen supply pressure. Restarting the power generation of the fuel cell may be performed when the processing time is greater than a preset reference time period. Restarting the power generation of the fuel cell may be completed after further purging with the hydrogen is completed.

The control method of a fuel cell system according to an exemplary embodiment of the present invention may minimize hydrogen crossover by adjusting hydrogen supply pressure of a fuel cell when stopping power generation of the fuel cell. By minimizing hydrogen crossover, fuel efficiency may be improved and exhaust gas may be reduced. When restarting power generation of the fuel cell, as hydrogen supply pressure may be increased and then the anode may be purged with hydrogen, nitrogen at an anode may be removed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural or functional descriptions in the exemplary embodiments of the present invention disclosed in the specification or application are only for description of the exemplary embodiments of the present invention, and can be embodied in various forms and should not be construed as limited to the embodiments described in the specification or application. Specific exemplary embodiments are illustrated in the drawings and described in detail in the specification or application because the exemplary embodiments of the present invention may have various forms and modifications. It should be understood, however, that there is no intent to limit the embodiments of the present invention to the specific exemplary embodiments, but the intention is to cover all modifications, equivalents, and alternatives included to the scope of the present invention.

Although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference now should be made to the drawings, in which the same reference numerals are used throughout the different drawings to designate the same or similar components.

The control method described herein below may be executed by a controller having a process and a memory. In addition the various voltages and pressures may be measured using various types of sensors.

Figure 2:
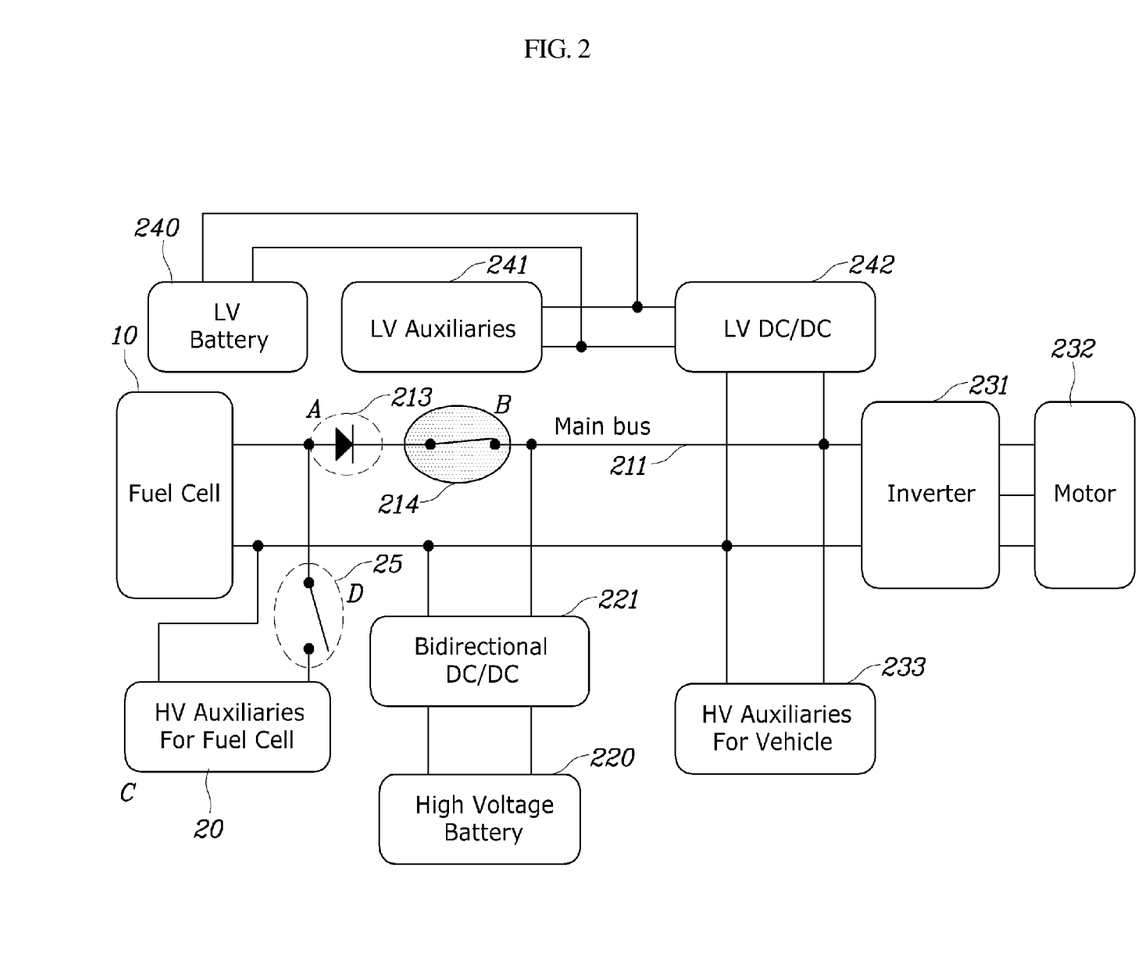
FIG. 2 is an exemplary block diagram of a power net of a fuel cell system according to an exemplary embodiment of the present invention.

FIG. 2 is an exemplary block diagram of a power net of a fuel cell system according to an exemplary embodiment of the present invention. As shown in FIG. 2, a fuel cell-battery hybrid system for a vehicle may include: a fuel cell 10 as a main power source and a high voltage battery (main battery) 220 as an auxiliary power source, the fuel cell 10 and the high voltage battery (e.g., main battery) 220 connected in parallel via a main bus terminal 211; a bidirectional direct-current/direct-current (DC/DC) converter (e.g., BHDC: Bidirectional High Voltage DC/DC Converter) 221 connected to the high voltage battery 220 for adjusting output power of the high voltage battery 220; an inverter 231 connected to the main bus terminal 211 on the output side of both the fuel cell 10 and the high voltage battery 220; a driving motor 232 connected to the inverter 231; a high voltage load 233 within the vehicle, exclusive of the inverter 231 and the driving motor 232; a low voltage battery (e.g., auxiliary battery) 240 and a low voltage load 241; a low voltage DC/DC converter (e.g., LDC: Low Voltage DC/DC Converter) 242, connected between the low voltage battery 240 and the main bus terminal 211, for converting a high voltage to a low voltage; and a fuel cell load device 20.

Herein, both the fuel cell 10 as a main power source and the high voltage battery 220 as an auxiliary power source may be connected in parallel via the main bus terminal 211 to intra-system loads such as the inverter 231, the driving motor 232, etc. The bidirectional DC/DC converter 221 connected to the high voltage battery may be connected to the main bus terminal 211 at the output side of the fuel cell 10, and therefore it may be possible to control output power of both the fuel cell 10 and the high voltage battery 220 by adjusting a voltage of the bidirectional DC/DC converter 221 (e.g., an output voltage to the main bus terminal).

The fuel cell 10 may include, at an output terminal thereof, with a diode 213 to prevent back current and with a relay 214 to selectively connect the fuel cell 10 to the main bus terminal 211. The relay 214 may be disposed within the power net shown in FIG. 2 but it is not arranged in the power net shown in FIGS. 3A and 3B. The relay 214 in FIG. 2 may connect the fuel cell 10 to the main bus during the idle stop/restart process of the fuel cell system as well as during the driving of the vehicle under a normal operation of the fuel cell 10 (e.g., when no error or failure occurs). The relay 214 may additionally disconnect the fuel cell 10 from the main bus upon the key-off of the vehicle (e.g., normal shutdown) or an emergency shutdown. The fuel cell load device 20 may be a load for draining a voltage of the fuel cell upon the start-up and shut-down of the fuel cell. The fuel cell 10 and the fuel cell load device 20 may be connected via a fuel cell load relay 25.

Figure 3A:
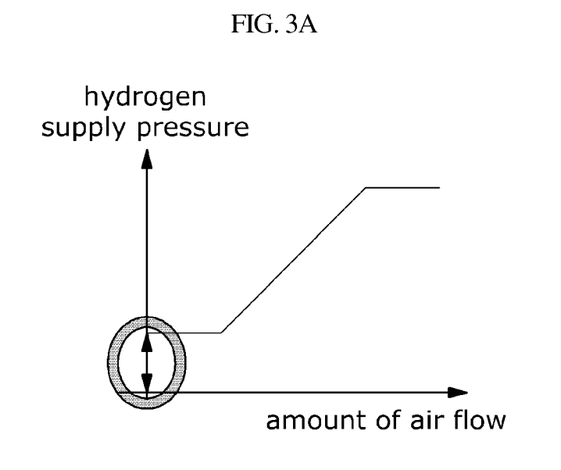
FIGS. 3A and 3B are exemplary graphs illustrating variations in hydrogen supply pressure according to a voltage of a fuel cell stack when stopping power generation of a fuel cell according to an exemplar embodiment of the present invention.
Figure 3B:
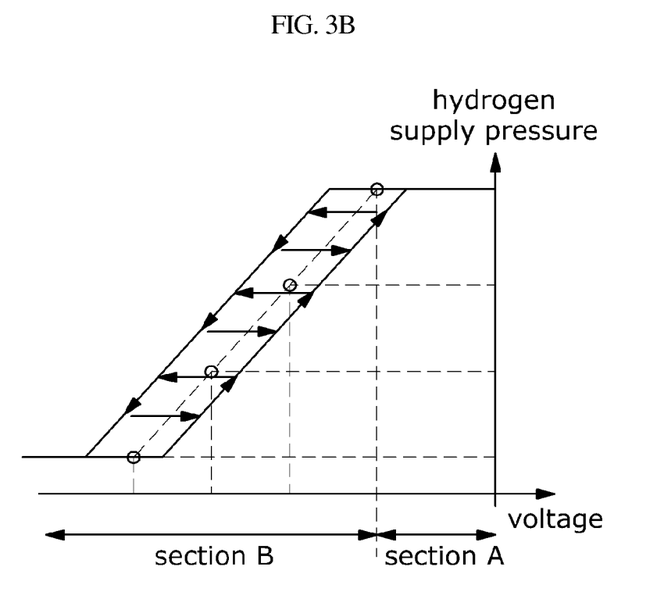
Figure 4:
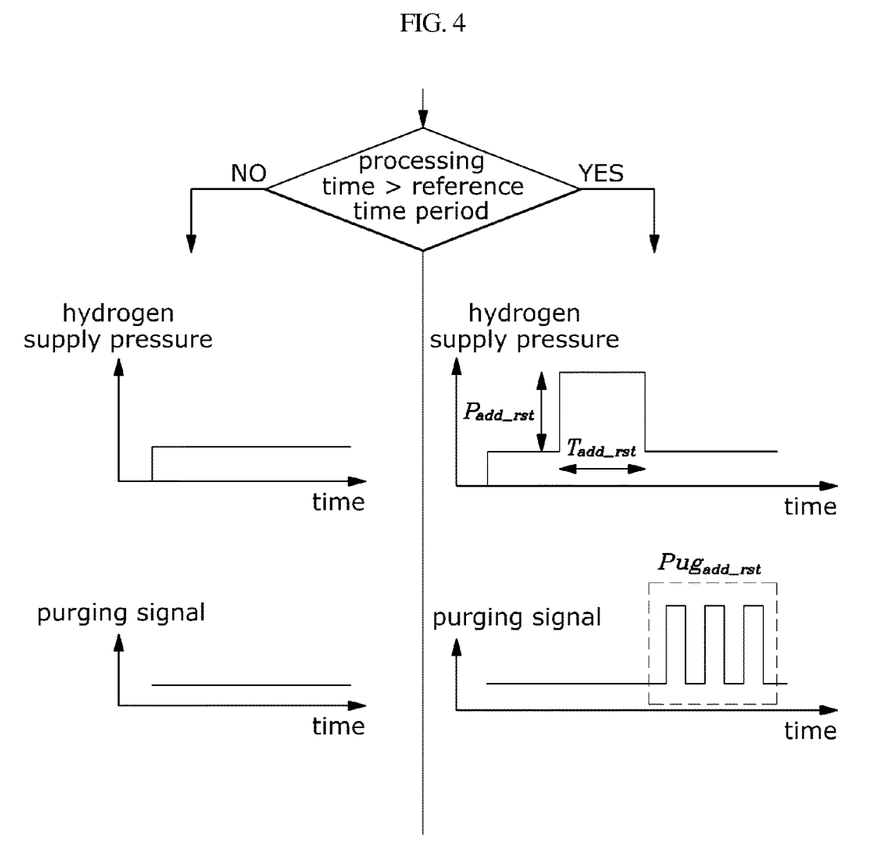
FIG. 4 is an exemplary view illustrating a fuel cell control method in which, according to a processing time for reducing hydrogen supply pressure, hydrogen supply pressure is increased when restarting a fuel cell, and an anode is purged with hydrogen according to an exemplary embodiment of the present invention.
Figure 5:
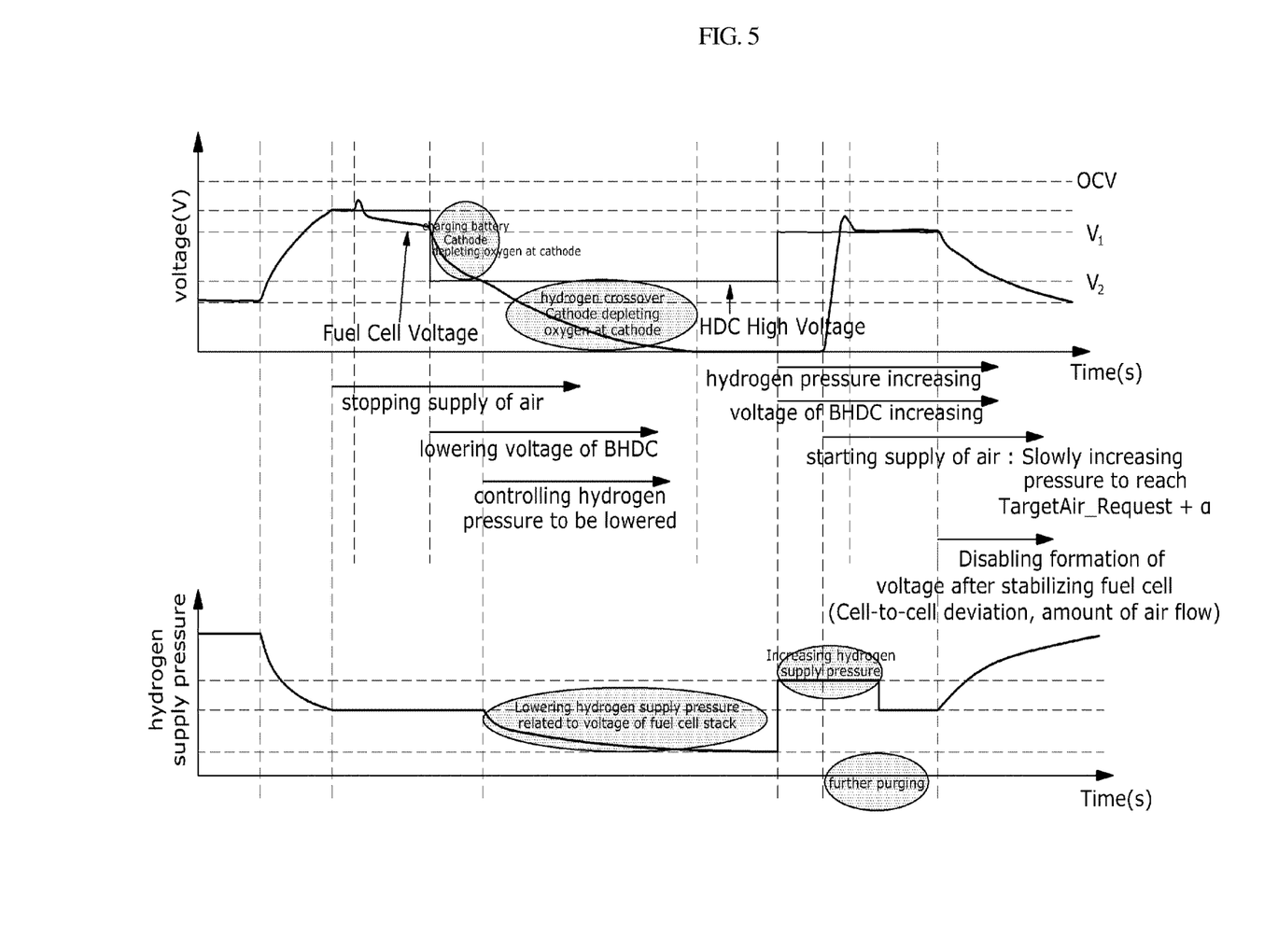
FIG. 5 is an exemplary graph illustrating variations in a voltage of a fuel cell stack and variations in hydrogen supply pressure with time in a fuel cell system according to an exemplary embodiment of the present invention.

FIGS. 3A and 3B are exemplary graphs illustrating variations in hydrogen supply pressure according to a voltage of a fuel cell stack when stopping power generation of a fuel cell. FIG. 4 is an exemplary simply illustrating a fuel cell control method in which, according to a processing time for reducing hydrogen supply pressure, hydrogen supply pressure may be increased when restarting a fuel cell, and an anode may be purged with hydrogen. FIG. 5 is an exemplary graph illustrating variations in a voltage of a fuel cell stack and variations in hydrogen supply pressure with time in a fuel cell system according to an exemplary embodiment of the present invention.

A control method of a fuel cell system according to an exemplary embodiment of the present invention may include detecting a voltage of a fuel cell stack when stopping power generation of a fuel cell; and adjusting hydrogen supply pressure at an anode side based on the detected variation in the voltage. In other words, existing fuel cell systems merely stop a supply of air after stopping the power generation of the fuel cell, while the fuel cell system according to an exemplary embodiment of the present invention stops the supply of air and also reduces a hydrogen supply pressure after stopping the power generation of the fuel cell.

The adjusting of the hydrogen supply pressure may be performed when a voltage of the fuel cell stack is less than a preset reference voltage after stopping power generation of the fuel cell. Prior to the adjustment of the hydrogen supply pressure, inflow of an air to the fuel cell stack 10 may be shutoff. In addition, when adjusting the hydrogen supply pressure, supply of output power from the fuel cell stack 10 to a main bus terminal 211 may be prevented by adjusting a voltage of the main bus terminal connected at the output side of the fuel cell 10 to be greater than the voltage of the fuel cell stack 10.

Further, when adjusting hydrogen supply pressure as shown in FIG. 3B, the hydrogen supply pressure may be adjusted to have a hysteresis range based on the variation in the voltage of the fuel cell stack 10. Generally, after stopping the power generation of the fuel cell, the voltage of the fuel cell stack 10 may be reduced by devices including a fuel cell load device 20, and the like. As the voltage of the fuel cell stack is decreased, the hydrogen supply pressure may be decreased. When the voltage of the fuel cell stack 10 is increased due to inflow of air to the fuel cell stack 10, the hydrogen supply pressure may be increased.

FIG. 3B is an exemplary detailed view of the marked section in FIG. 3A. As shown in FIG. 3A, when power generation of the fuel cell is stopped, the amount of air flow may be about zero and hydrogen supply pressure may remain substantially constant. However, as shown in FIG. 3B, the present invention may reduce the hydrogen supply pressure as the voltage of the fuel cell stack is decreased. Referring to FIG. 3B, the section A is a section for removing the voltage of the fuel cell stack 10. In other words, in the section A, the voltage of the fuel cell stack 10 may be depleted by intentionally charging a high voltage battery or using a fuel cell load device 20. After the voltage of the fuel cell stack 10 is forcibly decreased to be less than a preset voltage using the loads, in the section B, the hydrogen supply pressure may be reduced.

In the section B, as the voltage of the main bus terminal is set to be greater than the voltage of the fuel cell stack, the output power from the fuel cell stack may be shut off and hydrogen crossover from an anode to a cathode may be minimized. In addition, inflow of oxygen to the anode may be prevented. In particular, factors including response when restarting the fuel cell, frequencies of air shutoff valves operations, prevention of air inflow, and the like may be synthetically considered. In the section B, hydrogen supply pressure may be adjusted to have a hysteresis band. Accordingly, when the voltage of the fuel cell stack 10 is increased due to an inflow of air, the hydrogen supply pressure may be increased. When reducing the hydrogen supply pressure, the processing time for reducing the hydrogen supply pressure may be measured.

Referring to FIG. 5, as the voltage is decreased, when the voltage of the fuel cell stack is less than a preset voltage, the hydrogen supply pressure may be decreased. Additionally, the control method of a fuel cell system according to an exemplary embodiment of the present invention may further include purging an anode with hydrogen when restarting power generation of a fuel cell if the processing time for adjusting the hydrogen supply pressure at the anode side is greater than a reference time period that is preset based on the reduced hydrogen supply pressure.

Furthermore, comparing of a preset reference pressure with a time integral of the difference between the hydrogen supply pressure reduced by adjustment of the hydrogen supply pressure and an initial hydrogen supply pressure in which power generation of the fuel cell is stopped, when the integral is greater than the preset reference pressure, further purging of an anode with hydrogen when restarting power generation of the fuel cell may be included. In addition, comparing of a preset amount of nitrogen with a time integral of the transfer rate of nitrogen moved to the anode by adjustment of the hydrogen supply pressure, when the integral is greater than the preset amount of nitrogen, further purging the anode with hydrogen when restarting the power generation of the fuel cell may be included.

A preset reference time period may be compared with the processing time for adjusting the hydrogen supply pressure at the anode side, when the processing time is greater than the preset reference time period based on the reduced hydrogen supply pressure and the hydrogen supply pressure may be increased during a predetermined time period (Tadd_d_rst) when restarting power generation of the fuel cell. When the preset reference pressure is compared with a time integral of the difference between the hydrogen supply pressure reduced by adjustment of the hydrogen supply pressure and an initial hydrogen supply pressure in which power generation of the fuel cell is stopped and when the integral is greater than the preset reference pressure, hydrogen supply pressure may be increased during the predetermined time period (Tadd_rst) when restarting power generation of the fuel cell.

A preset amount of nitrogen may be compared with a time integral of the transfer rate of nitrogen moved to the anode by adjustment of the hydrogen supply pressure, when the integral is greater than the preset amount of nitrogen and the hydrogen supply pressure may be increased during the predetermined time period (Tadd_rst) when restarting the power generation of the fuel cell.

In particular, the preset reference time period may vary according to the hydrogen supply pressure. In other words, according to the degree of how much the hydrogen supply pressure is reduced (e.g., a reduction degree) by adjustment of the hydrogen supply pressure, the preset reference time period may be different. For example, even though the processing time for reducing the hydrogen supply pressure is of a particular length, when the degree of reducing the hydrogen supply pressure is less than that in which the processing time for reducing the hydrogen supply pressure is minimal, the reference time period may be set to be increased.

Moreover, the processing time exceeding the preset reference time period may proportional to the number of times that further purging is performed, and may be proportional to at least one the predetermined time period and the increased hydrogen supply pressure. In other words, assuming that the degree of reducing of the hydrogen supply pressure remains substantially constant with time, how much the processing time for adjusting the hydrogen supply pressure exceeds the preset reference time period may indicate how low the hydrogen supply pressure at the anode side is. Additionally, as the hydrogen supply pressure is reduced, the time period for increasing the hydrogen supply pressure (Tadd_rst) may be increased and the hydrogen supply pressure to be increased (Padd_rst) may be more substantial (e.g., may be increased). Additionally, the number of times that further purging is performed may be increased.

As described above, in existing fuel cell systems, when stopping power generation of the fuel cell, the amount of supplied air may be adjusted and hydrogen supply pressure may remain substantially constant. Consequently, comparing the preset reference pressure with a time integral of the difference between a constant value (e.g., the constant value is represented as an initial hydrogen supply pressure in which power generation of the fuel cell is stopped) and the hydrogen supply pressure reduced by adjustment of the hydrogen supply pressure, when the difference between the integral and the preset reference pressure is increased, it indicates that the hydrogen supply pressure is reduced substantially after stopping power generation of the fuel cell. Therefore, the anode may be further purged with hydrogen or the hydrogen supply pressure may be increased during the predetermined time period (Tadd_rst). For example, the difference between the preset reference pressure and the integral may be proportional to the predetermined time period (Tadd_rst), the hydrogen supply pressure to be increased (Padd_rst), or the number of times that further purging with hydrogen is performed.

Particularly, the transfer rate of nitrogen may be dependent on at least one among a humidified state of the fuel cell stack 10, the temperature of the fuel cell stack 10, a voltage of the fuel cell stack 10, or the difference between the hydrogen supply pressure lowered by adjustment of the hydrogen supply pressure and the initial hydrogen supply pressure in which power generation of the fuel cell is stopped. Specifically, the transfer rate of nitrogen may be increased as the humidified state of the fuel cell stack 10 increases; as the temperature of the fuel cell stack 10 increases; as the voltage of the fuel cell stack 10 decreases; and as the difference between the hydrogen supply pressure lowered by adjustment of the hydrogen supply pressure and the initial hydrogen supply pressure in which power generation of the fuel cell is stopped is substantial (e.g., is increased).

Both of the integrals described above have an upper limit, and the upper limit may be increased when a ram air flow is injected. The amount of inflow of the injected ram air may be detected by an air flow detect sensor, and it may be possible to determine that the inflow amount of the ram air is increased when the driving speed of the vehicle increases.

Furthermore, according to the control method of a fuel cell system of the present invention, the anode may be further purged with hydrogen (Pugadd_rst in FIG. 4) after increasing the hydrogen supply pressure during the predetermined time period. However, further purging with hydrogen may be performed after the amount of hydrogen at the anode reaches a target amount of hydrogen as the hydrogen supply pressure is increased by restarting power generation of the fuel cell and after air is supplied to a cathode since dilution of the air is required when purging with hydrogen. The number of times that further purging with hydrogen is performed and the cycle of purging with hydrogen may vary. Also, power generation may be restarted after purging with hydrogen is completed.

Referring to FIG. 5, hydrogen supply pressure may be increased and then purging with hydrogen may be performed to lower the hydrogen supply pressure. Purging with hydrogen may be performed after the supply of air has been started. In other words, after the amount of hydrogen at the anode side reaches a target amount, air may be supplied to the cathode, and then anode may be further purged with hydrogen. The target amount of hydrogen may be an amount required for restarting power generation of the fuel cell in a restart process of fuel cell power generation. When the hydrogen supply pressure is increased, or the anode is further purged with hydrogen, the amount of hydrogen may be greater than the target amount of hydrogen.

In other words, when the amount of hydrogen at the anode side reaches the target amount of hydrogen when restarting power generation of the fuel cell, air may be supplied to the cathode. Further purging with hydrogen may be performed after the supply of air. The restart process of fuel cell power generation may be started based on both the state of charge (SOC) of a high voltage battery and torque required by a driver. While power generation of the fuel cell is stopped, when the SOC of the high voltage battery is less than a reference value for SOC or when the torque required by the driver is greater than a reference value for torque, the restart process of fuel cell power generation may be started.

Additionally, the restart process of fuel cell power generation may be started when the integrals are greater than preset values or when the processing time is greater than a preset time. In particular, before the amount of the hydrogen at the anode side reaches the target amount, output power from the fuel cell stack may be shut off by adjusting the voltage of the main bus terminal connected at the output side of the fuel cell stack to be greater than the voltage of the fuel cell stack. The control method and system of a fuel cell system according to an exemplary embodiment of the present invention may thus minimize hydrogen crossover by adjusting hydrogen supply pressure of a fuel cell when stopping power generation of the fuel cell. By minimizing hydrogen crossover, fuel efficiency may be improved and exhaust gas may be reduced. When restarting power generation of the fuel cell, as hydrogen supply pressure may be increased and then the anode may be purged with hydrogen, nitrogen at an anode may be removed.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A control method of a fuel cell system, comprising:
   detecting, by a controller, a voltage of a fuel cell stack when stopping power generation of a fuel cell while a fuel cell vehicle is driven; and
   adjusting, by the controller, a hydrogen supply pressure at an anode side based on the detected voltage, further comprising: shutting off, by the controller, a supply of air to the fuel cell stack before adjusting the hydrogen supply pressure,
   wherein adjusting the hydrogen supply pressure at the anode side includes:
      reducing, by the controller, the hydrogen supply pressure as the detected voltage of the fuel cell stack is decreased, and
   wherein an amount of cross-over hydrogen from the anode side to the cathode side is minimized when stopping power generation of the fuel cell.
2. The control method of claim 1, wherein adjusting the hydrogen supply pressure is performed when the voltage of the fuel cell stack is less than a predetermined reference voltage after stopping the power generation of the fuel cell.

3. The control method of claim 2, wherein the predetermined reference voltage is a voltage of when the voltage of the fuel cell stack has been reduced by a load after stopping the power generation of the fuel cell.

4. The control method of claim 1, wherein adjusting the hydrogen supply pressure further includes:
adjusting a voltage of a main bus terminal connected at an output side of the fuel cell stack to be greater than the voltage of the fuel cell stack.

5. The control method of claim 1, wherein adjusting the hydrogen supply pressure at the anode side includes:
increasing, by the controller, the hydrogen supply pressure when the voltage of the fuel cell stack is increased due to inflow of air to the fuel cell stack.

6. The control method of claim 1, wherein adjusting the hydrogen supply pressure at the anode side adjusts the hydrogen supply pressure with a hysteresis range based the variation in the voltage of the fuel cell stack.

7. The control method of claim 1, further comprising:
comparing, by the controller, a preset reference time period with a processing time for adjusting the hydrogen supply pressure at the anode side; and
further purging, by the controller, the anode with hydrogen when restarting power generation of the fuel cell, when the processing time is greater than the preset reference time period based on the reduced hydrogen supply pressure.

8. The control method of claim 7, wherein the number of times that further purging is performed is proportional to the processing time exceeding the preset reference time period.

9. The control method of claim 1, further comprising:
comparing, by the controller, a preset reference pressure with a time integral of the difference between hydrogen supply pressure reduced by adjusting the hydrogen supply pressure and an initial hydrogen supply pressure in which power generation of the fuel cell is stopped; and
further purging, by the controller, the anode with hydrogen when restarting power generation of the fuel cell, when the integral is greater than the preset reference pressure.

10. The control method of claim 9, wherein the number of times that further purging is performed is proportional to the difference between the time integral and the preset reference pressure.

11. The control method of claim 1, further comprising:
comparing, by the controller, a preset amount of nitrogen with a time integral of a transfer rate of nitrogen moved into an anode side by adjusting the hydrogen supply pressure; and
further purging, by the controller, the anode with hydrogen when restarting power generation of the fuel cell, when the integral value is greater than the preset amount of nitrogen.

12. The control method of claim 11, wherein the number of times that further purging is performed is proportional to the difference between the integral and the preset amount of nitrogen.

13. The control method of claim 7, further comprising:
supplying, by the controller, air to a cathode after an amount of hydrogen at the anode side reaches a target amount as the hydrogen supply pressure is increased by restarting the power generation of the fuel cell,
wherein further purging the anode with hydrogen is performed after supplying the air to the cathode.

14. The control method of claim 13, wherein before the amount of hydrogen at the anode side reaches the target amount of hydrogen, a voltage of a main bus terminal connected at an output side of the fuel cell stack is adjusted to greater higher than the voltage of the fuel cell stack.

15. The control method of claim 1, further comprising
comparing, by the controller, a preset reference time period with a processing time for adjusting the hydrogen supply pressure at the anode side; and
increasing, by the controller, hydrogen supply pressure during a predetermined time period when restarting power generation of the fuel cell when the processing time is greater than the preset reference time period based on the reduced hydrogen supply pressure.

16. The control method of claim 15, wherein the processing time exceeding the preset reference time period is proportional to at least one of both the predetermined time period and the increased hydrogen supply pressure.

17. The control method of claim 1, further comprising:
comparing, by the controller, a preset reference pressure with a time integral of the difference between hydrogen supply pressure reduced by adjusting the hydrogen supply pressure and an initial hydrogen supply pressure in which the power generation of the fuel cell is stopped; and
increasing, by the controller, hydrogen supply pressure during a predetermined time period when restarting the power generation of the fuel cell when the integral is greater than the preset reference pressure.

18. The control method of claim 17, wherein the difference between the integral and the preset reference pressure is proportional to at least one of the predetermined time period and the increased hydrogen supply pressure.

19. The control method of claim 1, further comprising:
comparing, by the controller, a preset amount of nitrogen with a time integral of a transfer rate of nitrogen moved into the anode side by adjusting the hydrogen supply pressure; and
increasing, by the controller, the hydrogen supply pressure during a predetermined time period when restarting power generation of the fuel cell when the integral is greater than the preset amount of nitrogen.

20. The control method of claim 19, wherein the difference between the time integral and the preset amount of nitrogen is proportional to at least one of both the predetermined time period and the increased hydrogen supply pressure.

21. The control method of claim 11, wherein the transfer rate of nitrogen is dependent on at least one among the group selected from: a humidified state of the fuel cell stack, a voltage of the fuel cell stack, and the difference between hydrogen supply pressure reduced by adjusting the hydrogen supply pressure and an initial hydrogen supply pressure in which the power generation of the fuel cell is stopped.

22. The control method of claim 11, wherein the transfer rate of nitrogen is increased as a humidified state of the fuel cell stack increases, as a temperature of the fuel cell stack increases, as a voltage of the fuel cell stack decreases, and as the difference between hydrogen supply pressure reduced by adjusting the hydrogen supply pressure and an initial hydrogen supply pressure in which the power generation of the fuel cell is stopped increases.

23. The control method of claim 9, wherein the integral has an upper limit,
wherein the upper limit is increased when a ram air flow is injected, and
wherein restarting the power generation of the fuel cell is performed when the integral is greater than a preset value.

24. The control method of claim 15, further comprising:
further purging, by the controller, with hydrogen after increasing the hydrogen supply pressure.

25. The control method of claim 7, wherein restarting the power generation of the fuel cell is performed when the processing time is greater than a preset reference time period.

26. The control method of claim 7, wherein restarting the power generation of the fuel cell is completed after further purging with the hydrogen is completed.

27. The control method of claim 24, wherein restarting the power generation of the fuel cell is completed after further purging with the hydrogen is completed.

28. The control method of claim 19, wherein the transfer rate of nitrogen is dependent on at least one selected from the group consisting of: a humidified state of the fuel cell stack, a voltage of the fuel cell stack, and the difference between hydrogen supply pressure reduced by adjusting the hydrogen supply pressure and an initial hydrogen supply pressure in which the power generation of the fuel cell is stopped.

29. The control method of claim 19, wherein the transfer rate of nitrogen is increased as a humidified state of the fuel cell stack increases, as a temperature of the fuel cell stack increases, as a voltage of the fuel cell stack decreases, and as the difference between hydrogen supply pressure reduced by adjusting the hydrogen supply pressure and an initial hydrogen supply pressure in which the power generation of the fuel cell is stopped increases.

30. The control method of claim 17, further comprising:
further purging, by the controller, with hydrogen after increasing the hydrogen supply pressure.

31. The control method of claim 19, further comprising:
further purging, by the controller, with hydrogen after increasing the hydrogen supply pressure.

32. The control method of claim 15, wherein restarting the power generation of the fuel cell is performed when the processing time is greater than a preset reference time period.

33. The control method of claim 9, wherein restarting the power generation of the fuel cell is completed after further purging with the hydrogen is completed.

34. The control method of claim 11, wherein restarting the power generation of the fuel cell is completed after further purging with the hydrogen is completed.

* * * * *